Nov. 16, 1926.
A. C. DURDIN, JR
1,607,246
SEWAGE PUMPING APPARATUS
Filed August 2, 1926
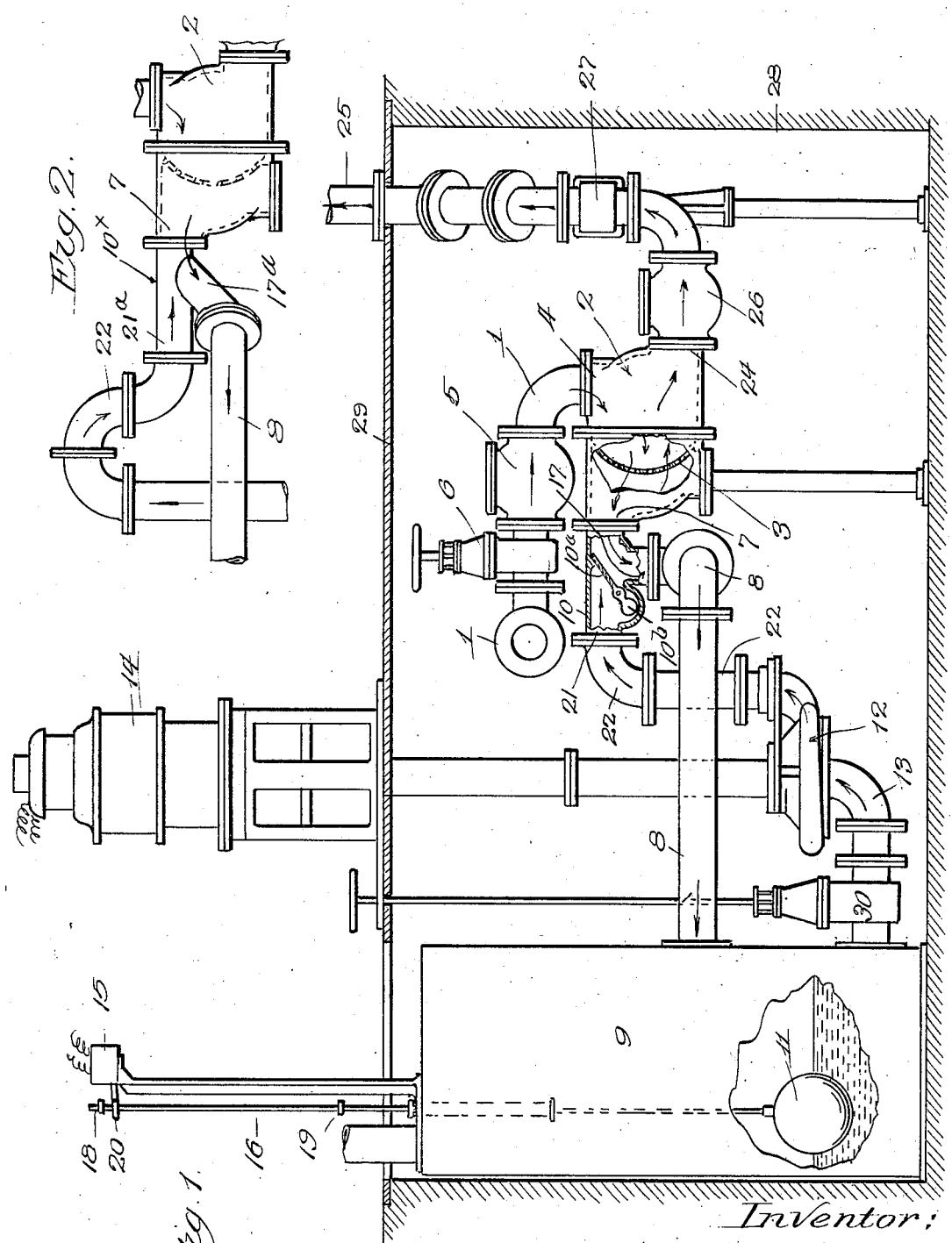

Patented Nov. 16, 1926.

1,607,246

UNITED STATES PATENT OFFICE.

AUGUSTUS C. DURDIN, JR., OF CHICAGO, ILLINOIS, ASSIGNOR TO CHICAGO PUMP COMPANY, OF CHICAGO, ILLINOIS, A CORPORATION OF ILLINOIS.

SEWAGE-PUMPING APPARATUS.

Application filed August 2, 1926. Serial No. 126,497.

This invention relates to sewage pumping apparatus and more particularly to apparatus for handling liquids containing more or less solid substances. A pump is usually employed in connection with apparatus of this kind and one of the objects of the present invention is to provide improved means for preventing the more or less solid substances from entering the pump thereby eliminating the possibility of clogging the pump or causing serious injury thereto. Another object is to provide a separating device or screening device for the pump and arranged in the conduit or pipe in such manner that the incoming strained or screened liquid does not flow directly through the pump but passes to a receiving chamber and thence to its intake side and is pumped back through the separating device or screening device, whereby the latter is freed from accumulated more or less solid substances and the accumulations are discharged into the sewer or other place where the sewage is to be disposed of.

With these and other objects and advantages in view, this invention consists in a pumping apparatus embodying a separating device or screening device having an inlet through which the incoming sewage water enters, and an outlet, with a separating or screening element therebetween, and a valve controlled two way conduit leading from said separating device or screening device, one of said conduits leading to a collection chamber such as a tank or reservoir, and the other leading to the discharge side of the pump. It further consists in an apparatus as above set forth containing automatic means for starting and stopping the pump and controlled by the volume of liquid in the collection chamber, whereby said collected liquid may be pumped back through the separating device or screening device to free the same of the accumulated more or less solid substances and discharge the same from the apparatus. The invention further consists in the several novel features of construction, arrangement and combination of parts hereinafter fully set forth and claimed.

The invention is clearly illustrated in the drawing accompanying the specification in which Fig. 1 is a view, partly in side elevation and partly in vertical section, of sewage pumping apparatus embodying a simple form of the present invention, and Fig. 2 is a fragmental view showing a slightly modified form of the invention.

Referring to said drawing, and first to Fig. 1 the reference character 1 designates the inlet pipe, which connects with the sewage or other pipe of the source of liquid supply, and 2 designates a separating device or screening device into which the inlet pipe discharges through an inlet 4. In its present form, the separating device is shown in the form of a strainer or screening device and is provided with a screen 3 through which the liquids may pass, but which intercepts the more or less solid substances. The inlet pipe 1 contains a check valve 5 opening in the direction of the screening device and if desired a valve 6 may be provided in said pipe in front of the check valve whereby the apparatus may be shut off from the source from which the sewage is obtained.

The separating device or screening device 2 has an outlet 7 to which is connected a two way valve 10, one branch 17, which leads in a downward direction and is connected to a pipe 8, which leads to and discharges into a collection chamber 9, such as a tank or reservoir. The other branch 21 connects with a discharge pipe 22 that runs to the discharge end of the pump 12, the intake end which is connected to the chamber 9 by a pipe 13. The pipe 8, reservoir 9 and pipe 13 form a conduit leading from a valve 10 to the intake side of the pump. The pump 12 is connected to and driven by an electric motor 14, and a switch 15 is provided for said motor, which switch is operated by a float 11 contained in the chamber 9. In the form of switch operating mechanism shown the switch lever 20 is operated by buttons 18, 19 mounted upon a switch actuating rod 16 which has the float 11 secured to its lower end. The arrangement of these parts is such that when the liquid in the chamber 9 is at a low level, the switch 15 is open and the motor and pump are at rest. When however, the level of the liquid in said chamber reaches a predetermined high level, the switch is closed, thereby closing the circuit through the motor, which is thereupon set in motion and the pump started.

In the form of the invention illustrated, the valve 10 contains a valve disc $10^a$, which is counterweighted, as for instance by counterweight 10ᵇ, and when the pump is at rest said counterweight holds the valve disc in the closed position seen in Fig. 1 thereby shutting off communication between the inlet side of the valve 10 and the branch 21. In this condition liquid entering the valve 10 from the separating device, or screening device, discharges through the branch 17 and flows into the chamber 9. When the pump is set in motion the liquid is discharged from the reservoir, it opens the passage through the branch 21 and closes the passage through branch 17 by swinging the valve disc 10ᵃ down, thereby permitting the liquid to be pumped from the chamber 9 to the separating device.

A discharge pipe 25 leads from a discharge outlet 24 of the separating device 2, and an outwardly opening check valve 26 may be interposed between the discharge pipe 25 and separating device 2. Furthermore if desired a valve 27 may be interposed in the pipe 25 and a valve 30 may be interposed in the pipe 13 whereby the apparatus may be shut off from the discharge system and the chamber 9. The most of the apparatus may be contained in a pit 28 covered by a cover 29 which may form the support for the pump motor.

In the operation of this device, the sewage or other liquid enters the separating device 2 through the inlet pipe 1 and when the pump 12 is stationary the liquid flows through the screen 3 and into the valve 10 where it discharges into the pipe 8 and enters the chamber 9. The more or less solid matters contained in the liquid, are intercepted by the screen 3 and left on the bottom of the separating or screening device 2. As soon as the liquid in the chamber 9 reaches a predetermined high level, the switch 15 is closed and the pump motor is started thereby operating the pump, which discharges liquid from the chamber 9 through the discharge pipe 22 and into the branch 21 of the valve 10 where the liquid forces the valve disc 10ᵃ down, thereby opening the passage 21 through the valve. The liquid discharges through the outlet opening 7 into the separating or screening device 2 and passes through the screen 3 where it frees the screen of the accumulated more or less solid substances and discharges all out through the discharge pipe 25. When the low level of the water in the chamber 9 is reached, the switch is opened, the pump stopped and the former operation repeated. This intermittent action is carried on indefinitely.

It will be noted that although the sewage matter is free to pass the check valve 5 on its way to the separating device it cannot be pumped back beyond said check valve. Furthermore that liquids and other foreign matters which are pumped beyond the check valve 26 cannot return to the apparatus.

While this apparatus has been shown and described in connection with a sewage system it is to be understood that its use is not limited thereto as it may be employed in any situation where it is desired to pump liquids containing more or less solid substances which require to be kept from entering the pump.

In the form of the invention illustrated in Fig. 2 the apparatus may be substantially the same as that illustrated in Fig. 1 except that the valve 10 may be omitted and in place thereof a Y coupling, 10ˣ is used, one end of which connects with the outlet opening 7 of the separating device 2, and one branch 17ᵃ of which connects with the pipe 8 that leads to the chamber 9. The other branch 21ᵃ connects with the discharge pipe 22 of the pump. Preferably the branch 17ᵃ is arranged at a downwardly inclined angle as shown. In this arrangement, the incoming liquid flows down the branch 17ᵃ and enters the chamber 9 as in the preferred form. The velocity of the liquid is slight as usual and is free to take this course. When the pump is operated the velocity is great and the liquid rushes past the opening to the branch 17ᵃ and discharges into the separating device 2.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. In an apparatus for pumping liquids containing more or less solid substances, the combination of a separator having an inlet opening arranged to be connected to a source of liquid supply, and a discharge opening arranged to be connected to a discharge pipe, said separator having means for restraining the flow of solid substances while permitting the liquid to flow to and from an outlet opening in the separator, an intermittently acting, motor-operated pump, a conduit leading from said outlet opening of the separator to the inlet side of said pump, a liquid receiving chamber interposed in said conduit, and a liquid discharge conduit leading from the discharge side of the pump to said outlet opening of the receptacle.

2. In an apparatus for pumping liquids containing more or less solid substances, the combination of a separator having an inlet opening arranged to be connected to a source of liquid supply, and a discharge opening arranged to be connected to a discharge pipe, said separator having means for restraining the flow of solid substances, while permitting the liquid to flow to and from an outlet opening in the separator, an intermittently acting, motor-operated pump, a conduit leading from said outlet opening of the separator to the inlet side of said pump, a liquid receiving chamber interposed in said conduit, a liquid discharge conduit leading from the discharge side of the pump to said outlet opening of the receptacle, and a two way valve interposed between said outlet opening of the separator and the two conduits leading thereto.

3. In an apparatus for pumping liquids containing more or less solid substances, the combination of a separator having an inlet opening arranged to be connected to a source of liquid supply, and a discharge opening arranged to be connected to a discharge pipe, said separator having means for restraining the flow of solid substances, while permitting the liquid to flow to and from an outlet opening in the separator, an intermittently acting, motor-operated pump, a conduit leading from said outlet opening of the separator to the inlet side of said pump, a liquid receiving chamber interposed in said conduit, a liquid discharge conduit leading from the discharge side of the pump to said outlet opening of the receptacle, and a two way valve interposed between said outlet opening of the separator and both of the two conduits leading thereto, said valve having a counterweighted valve member normally closing the passage to the discharge conduit from the pump.

4. In an apparatus for pumping liquids containing more or less solid substances, the combination of a separator having an inlet opening arranged to be connected to a source of liquid supply, and a discharge opening arranged to be connected to a discharge pipe, said separator having a screen for intercepting the solid substances, while permitting the liquid to flow to and from an outlet opening in the separator, an intermittently acting, motor-operated pump, a conduit leading from said outlet opening of the separator to the inlet side of said pump, a liquid receiving chamber interposed in said conduit, and a liquid discharge conduit leading from the discharge side of the pump to said outlet opening of the receptacle.

5. In an apparatus for pumping liquids containing more or less solid substances, the combination of a separator having an inlet opening arranged to be connected to a source of liquid supply, and a discharge opening arranged to be connected to a discharge pipe, said separator having a screen for intercepting the solid substances, while permitting the liquid to flow to and from an outlet opening in the separator, an intermittently acting, motor-operated pump, a conduit leading from said outlet opening of the separator to the inlet side of said pump, a liquid receiving chamber interposed in said conduit, a liquid discharge conduit leading from the discharge side of the pump to said outlet opening of the receptacle, and a two way valve interposed between said outlet opening of the separator and the two conduits leading thereto.

6. In an apparatus for pumping liquids containing more or less solid substances, the combination of a separator having an inlet opening arranged to be connected to a source of liquid supply, and a discharge opening arranged to be connected to a discharge pipe, said separator having a screen for intercepting solid substances, while permitting the liquid to flow to and from an outlet opening in the separator, an intermittently acting, motor-operated pump, a conduit leading from said outlet opening of the separator to the inlet side of said pump, a liquid receiving chamber interposed in said conduit, a liquid discharge conduit leading from the discharge side of the pump to said outlet opening of the receptacle, and a two way valve interposed between said outlet opening of the separator and both of the two conduits leading thereto, said valve having a counterweighted valve member normally closing the passage to the discharge conduit from the pump.

7. In an apparatus for pumping liquids containing more or less solid substances, the combination of a separator having an inlet opening arranged to be connected to a source of liquid supply, and a discharge opening arranged to be connected to a discharge pipe, said separator having means for restraining the flow of solid substances, while permitting the liquid to flow to and from an outlet opening in the separator, an intermittently acting, motor-operated pump, a conduit leading from said outlet opening of the separator to the inlet side of said pump, a liquid receiving chamber interposed in said conduit, a motor controlling switch mechanism for starting and stopping the motor of the pump, and operated by the rise and fall of liquid in said chamber, and a liquid discharge conduit leading from the discharge side of the pump to said outlet opening of the receptacle.

8. In an apparatus for pumping liquids containing more or less solid substances, the combination of a separator having an inlet opening arranged to be connected to a source of liquid supply, and a discharge opening arranged to be connected to a discharge pipe, said separator having means for restraining the flow of solid substances, while permitting the liquid to flow to and from an outlet opening in the separator, an intermittently acting, motor-operated pump, a conduit leading from said outlet opening of the separator to the inlet side of said pump, a liquid receiving chamber interposed in said conduit, a float operated motor controlling switch mechanism for starting and stopping the motor of the pump and operated by the rise and fall of liquid in said chamber, and a liquid discharge conduit leading from the discharge side of the pump to said outlet opening of the receptacle.

9. In an apparatus for pumping liquids containing more or less solid substances, the combination of a separator having an inlet opening arranged to be connected to a source of liquid supply, and a discharge opening arranged to be connected to a discharge pipe, said separator having means for restraining the flow of solid substances, while permitting the liquid to flow to and from an outlet opening in the separator, an intermittently acting, motor-operated pump, a conduit leading from said outlet opening of the separator to the inlet side of said pump, a a liquid receiving chamber interposed in said conduit, a float operated, motor controlling switch mechanism for starting and stopping the motor of the pump and operated by the rise and fall of liquid in said chamber, a liquid discharge conduit leading from the discharge side of the pump to said outlet opening of the receptacle, and a two way valve interposed between said outlet opening of the separator and the two conduits leading thereto.

10. In an apparatus for pumping liquids containing more or less solid substances, the combination of a separator having an inlet opening arranged to be connected to a source of liquid supply, and a discharge opening arranged to be connected to a discharge pipe, said separator having means for restraining the flow of solid substances, while permitting the liquid to flow to and from an outlet opening in the separator, an intermittently acting, motor-operated pump, a conduit leading from said outlet opening of the separator to the inlet side of said pump, a liquid receiving chamber interposed in said conduit, a float operated motor controlling switch mechanism for starting and stopping the motor of the pump and operated by the rise and fall of liquid in said chamber, a liquid discharge conduit leading from the discharge side of the pump to said outlet opening of the receptacle, and a two way valve interposed between said outlet opening of the separator and both of the two conduits leading thereto, said valve having a counterweighted valve member normally closing the passage to the discharge conduit from the pump.

11. In an apparatus for pumping liquids containing more or less solid substances, the combination of a separator, connected to a source of liquid supply, and connected to a discharge pipe, said separator having means for restraining the flow of solid substances, while permitting the liquid to flow to and from an outlet opening in said separator, an intermittently acting, motor-operated pump, a liquid receiving chamber opening to the outlet opening of the separator and to the intake side of the pump, and a liquid discharge conduit leading from the discharge side of the pump to said outlet opening of the receptacle.

AUGUSTUS C. DURDIN, Jr.